United States Patent Office.

JOHN COMMINS, OF CHARLESTON, SOUTH CAROLINA.

Letters Patent No. 107,878, dated October 4, 1870.

IMPROVEMENT IN THE MANUFACTURE OF FERTILIZERS.

The Schedule referred to in these Letters Patent and making part of the same.

*To all whom it may concern:*

Be it known that I, JOHN COMMINS, of Charleston, in the district of Charleston and State of South Carolina, have invented or discovered a new and useful Fertilizer; and I do hereby declare that the following is a full, clear, and exact description thereof.

The nature of my invention or discovery consists in the utilization of the black salt-marsh grass (*spartina Glabia*) in the manufacture of fertilizers.

This substance, I have discovered, contains a large amount of nitrogen, also about ten per cent. of potash and eight per cent. of soda. It grows in abundance along the seacoast, and is obtainable at very little expense.

The method of preparing the grass, so as to obtain the greatest benefit from it, is to reduce it to a fine state, either by cutting or grinding machinery, after which it can be macerated and reduced to a pulpy mass.

By thus disintegrating the grass it is in a suitable condition to readily obtain from it its alkaline salts, and to part with its ammonia when mixed with phosphates.

If desirable, the grass, reduced as described, may be condensed by pressure, and thus rendered more compact for transportation.

I am aware that this black salt-marsh grass has been used for many years, in its material state, as a fertilizer, but I believe that I am the first to have prepared this grass by disintegrating it, and thus reducing it to a merchantable condition, and adapting it to be used with other fertilizers for enriching and improving their qualities.

I claim, as a new article of manufacture, and desire to secure by Letters Patent—

The black salt-marsh grass, prepared as described, for use with phosphates or animal matter.

JOHN COMMINS.

Witnesses:
D. M. MOLEN,
JAMES FINLEY.